United States Patent
Zachar

(10) Patent No.: US 7,891,188 B2
(45) Date of Patent: *Feb. 22, 2011

(54) APPARATUS FOR PRODUCING POWER USING GEOTHERMAL LIQUID

(75) Inventor: Oron David Zachar, Tel Aviv (IL)

(73) Assignee: Ormat Technologies, Inc., Sparks, NV (US)

( * ) Notice: Subject to any disclaimer, the term of this patent is extended or adjusted under 35 U.S.C. 154(b) by 656 days.

This patent is subject to a terminal disclaimer.

(21) Appl. No.: 11/790,343

(22) Filed: Apr. 25, 2007

(65) Prior Publication Data

US 2007/0251237 A1 Nov. 1, 2007

Related U.S. Application Data

(62) Division of application No. 10/861,350, filed on Jun. 7, 2004, now abandoned.

(51) Int. Cl.
*F03G 7/00* (2006.01)
(52) U.S. Cl. ........................ 60/641.2; 60/659
(58) Field of Classification Search ..... 60/641.2–641.5, 60/659
See application file for complete search history.

(56) References Cited

U.S. PATENT DOCUMENTS

| 4,776,169 | A | * | 10/1988 | Coles, Jr. | 60/641.2 |
| 5,598,706 | A | * | 2/1997 | Bronicki et al. | 60/641.2 |
| 5,661,977 | A | * | 9/1997 | Shnell | 60/641.2 |
| 7,178,337 | B2 | * | 2/2007 | Pflanz | 60/641.2 |
| 2002/0145288 | A1 | * | 10/2002 | Van Breems | 290/42 |
| 2003/0006136 | A1 | * | 1/2003 | Hiki et al. | 204/274 |
| 2003/0010652 | A1 | * | 1/2003 | Hunt | 205/742 |
| 2009/0107143 | A1 | * | 4/2009 | Zachar | 60/641.2 |

* cited by examiner

*Primary Examiner*—Hoang M Nguyen
(74) *Attorney, Agent, or Firm*—The Nath Law Group; Jerald L. Meyer; Stanley N. Protigal

(57) ABSTRACT

The present inventive subject matter is drawn to an apparatus for producing power using geothermal liquid comprising: a geothermal power plant for producing power using heat contained in geothermal liquid supplied thereto; and heating means apparatus for heating a solution and producing a heated solution for use in an electrolysis unit with heat from heat depleted geothermal liquid exiting a vaporizer of the geothermal power plant, wherein the electrolysis unit produces hydrogen for use in producing power.

12 Claims, 4 Drawing Sheets

APPARATUS FOR PRODUCING POWER USING GEOTHERMAL LIQUID

This application is a divisional application of Ser. No. 10/861,350, filed Jun. 7, 2004 now abandoned, the contents of which are hereby incorporated in their entirety.

BACKGROUND OF THE INVENTION

1. Technical Field

This invention relates to a method and apparatus for producing hydrogen using geothermal energy, and more particularly, to a method and apparatus for producing hydrogen via electrolysis using geothermal energy.

2. Background of the Invention

Recently an increasing interest has been developing in methods of producing renewable energy that produces little or minimal pollution. One of the ways is using hydrogen to produce power or electricity. However, the methods of producing hydrogen at present are rather expensive and also can cause pollution.

U.S. Pat. No. 5,661,977 discloses a system for generation of electricity from geothermal energy wherein one or more substances are transported down a well to a depth at which geothermal heat (whether from brine or steam reservoirs or hot, dry rock) is sufficient to cause an endothermic reaction or an electrolysis reaction to occur among substances. In a second embodiment of the invention disclosed in this U.S. patent, a system is disclosed for the generation of electricity from geothermal energy wherein one juncture of a thermocouple is transported down a well to a depth at which geothermal heat is sufficient to create a temperature difference, relative to the temperature of the other juncture of the thermocouple. Such systems are rather complicated to construct so that the costs for constructing such system could be high.

Geothermal energy is conventionally produced using a constant flow rate of the geothermal fluid. Due to this, such a geothermal power plant operates at a fixed production level, while on the other hand, consumer power demand varies significantly between peak hours and off-peak hours. As a result, operation of such geothermal power plants is not cost effective.

As far as room temperature electrolysis operated at atmospheric pressure is concerned, the energy requirements are relatively high. Thus, electrolysis is a relatively expensive method of producing hydrogen.

Fouillac et al. (2003) discuss the use of geothermal heat to pre-heat the solution for high temperature (around 900° C. or more) electrolysis with additional energy sources such as coal- or gas-fired power being combined for such a use. In this paper, it is suggested that the geothermal energy could be combined with nuclear power plant energy.

It is therefore an object of the present invention to provide a new and improved method of and apparatus for producing hydrogen and operation of geothermal power plants wherein the disadvantages as outlined above are reduced or substantially overcome.

SUMMARY OF THE INVENTION

The present inventive subject matter is drawn to apparatus for producing hydrogen using geothermal energy comprising: heating means apparatus for heating a solution for use in electrolysis with heat from geothermal fluid and producing a heated solution; and electrolysis means apparatus for producing hydrogen by electrolysis of said heated solution.

The present invention also relates to a method for producing hydrogen using geothermal energy comprising: heating a solution for use in electrolysis with heat from geothermal fluid and producing a heated solution; and producing hydrogen by electrolysis of said heated solution.

In a further embodiment of the present invention, apparatus for producing hydrogen using geothermal energy is provided comprising: heating means for heating a solution for use in electrolysis with heat from geothermal fluid and producing a heated solution; electrolysis means apparatus for producing hydrogen by electrolysis of said heated solution; and power producing means utilizing the pressure of said hydrogen for producing power.

In this embodiment, a method for producing hydrogen using geothermal energy is also provided comprising: heating a solution for use in electrolysis with heat from geothermal fluid and producing a heated solution; producing hydrogen by electrolysis of said heated solution; and utilizing the pressure of said hydrogen for producing power.

The integration of geothermal and electrolysis plants of the present invention as described herein is advantageous since the efficiency of the integrated or combined geothermal and electrolysis plant is higher than independently operated plants. This is achieved by using the heat present in the geothermal fluid for heating the solution prior to electrolysis and also permitting the use of the pressure of the hydrogen and/or oxygen electrolysis products in the pumping of brine to be injected into the injection well of the geothermal power plant.

Furthermore, the method and apparatus of the present invention permits the integrated or combined geothermal and electrolysis plant to have flexible modes of operation during peak and off-peak demand hours. In particular, the hydrogen and oxygen produced by the electrolysis system of the present invention are energy storage vehicles that enable the shift of off-peak geothermal power to be sold and consumed during periods of peak power demand. The local use of the electrolysis hydrogen and oxygen products make it unnecessary to use high-pressure storage or transportation of these gases. Consequently, the available pressure of the electrolysis produced hydrogen and oxygen can be used for other purposes. More importantly, the above-mentioned flexibility of operation of the integrated or combined plant is achieved while the geothermal fluid pumping rate remains substantially constant. This is achieved by using a combination of valves that permits the variable diversion of the geothermal fluid from the geothermal power plant to the electrolysis system.

BRIEF DESCRIPTION OF THE DRAWINGS

A description of the present inventive subject matter including embodiments thereof is presented and with reference to the accompanying drawings, the description is not meant to be considered limiting in any manner, wherein.

Like reference numerals and designations in the various drawings refer to like elements.

DETAILED DESCRIPTION

Figure 1:
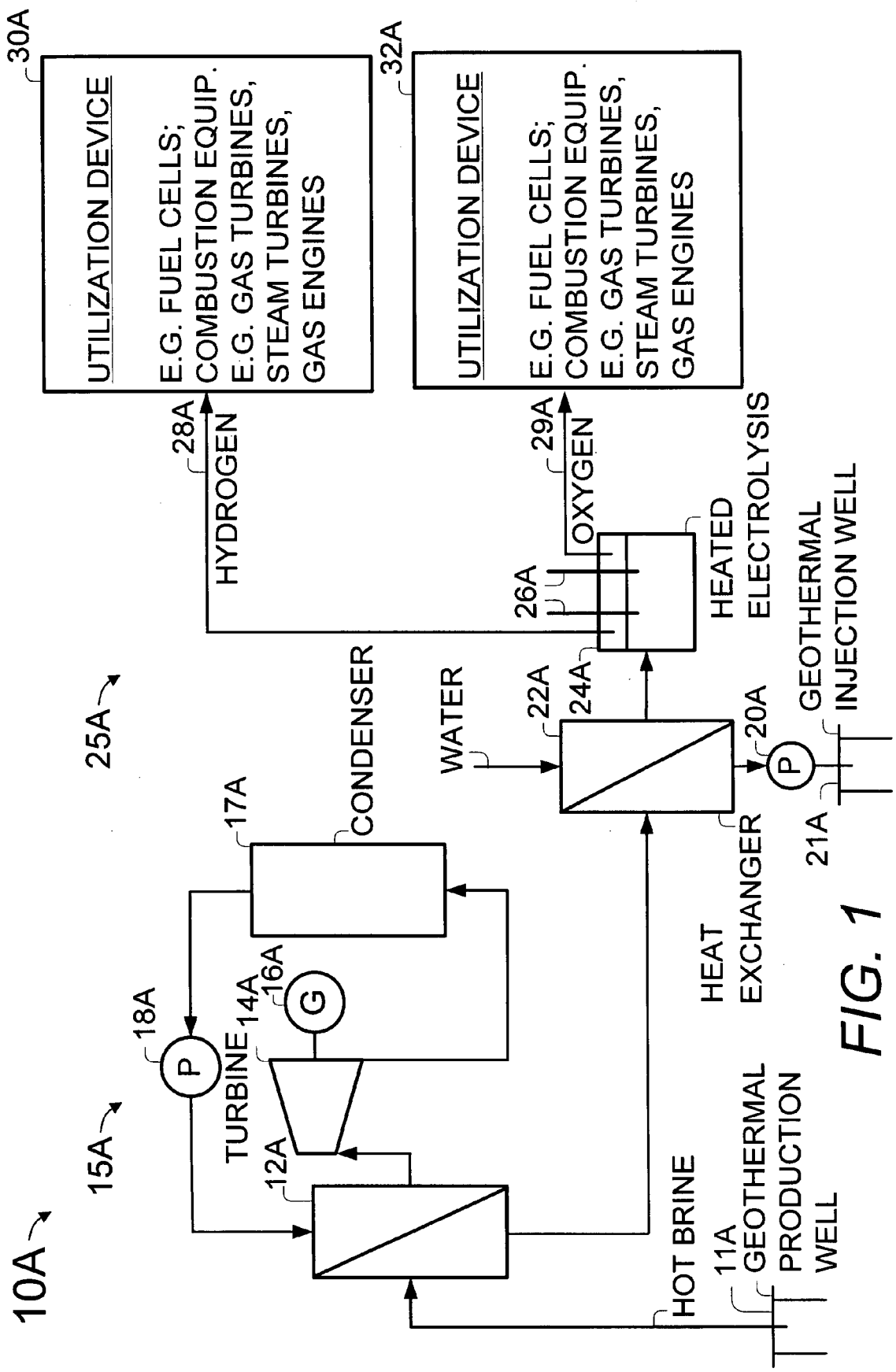
FIG. 1 is a graphical representation of a combined power plant.

Turning now to the Figures, FIG. 1 represents an embodiment of a combined power plant that operates in accordance with the present invention. As can be seen from the figure, numeral 10A designates a combined power plant for the production of hydrogen using geothermal energy. Combined power plant 10A includes vaporizer 12A of geothermal power plant 15A for vaporizing working fluid present in the vaporizer using heat present in geothermal liquid or brine supplied thereto, the geothermal liquid or brine being produced by a separator (not shown) that separates the geothermal liquid or brine as well as geothermal steam from geothermal fluid extracted from production well 11A. Working fluid vapor exiting vaporizer 12A is supplied to vapor turbine 14A where it is expanded and power is produced as well as expanded working fluid. Preferably, vapor turbine 14A drives electric generator 16A for producing electric power. Expanded working fluid vapor exiting vapor turbine 14A is supplied to condenser 17A, which is an air-cooled condenser or a water-cooled condenser, and working fluid condensate is produced which is supplied to vaporizer 12A using cycle pump 18A. Preferably, an organic working fluid is used for working fluid of geothermal power plant 15A. Examples of such organic working fluids are butane, i.e. n-butane, or iso-butane, pentane, i.e. n-pentane, or iso-pentane, hexane, i.e. n-hexane, or iso-hexane, etc. and mixtures of the above-mentioned fluids, preferably, pentane, i.e. n-pentane, or iso-pentane.

In accordance with this embodiment of the present invention, heat depleted geothermal liquid or brine exiting vaporizer 12A is supplied to heat exchanger 22A of electrolysis system 25A for heating water or solution supplied thereto. Specific advantages of using electrolysis together with a fuel cell are described in U.S. Pat. No. 6,127,055. Thereafter, the further heat-depleted geothermal liquid or brine is supplied to injection well 21A using pump 20A. The heated water or heated solution exiting heat exchanger 22A is supplied to electrolysis unit 24A wherein electrolysis of the heated water or heated solution is carried out. During electrolysis of the heated water or heated solution using electrodes 26A hydrogen and oxygen are produced in hydrogen supply means 28A and oxygen supply means 29A. Hydrogen may be used in utilization device 30A to produce e.g. in electricity using e.g. fuel cells, combustion processes such as in gas turbines, steam turbines, internal combustion engines, etc. Alternatively, the hydrogen produced can be used to produce methanol or ammonia. Oxygen produced can be used in utilization device 32A e.g. in combustion processes such as in gas turbines or steam turbines, or used together with hydrogen in a fuel cell to produce electricity.

Figure 2:
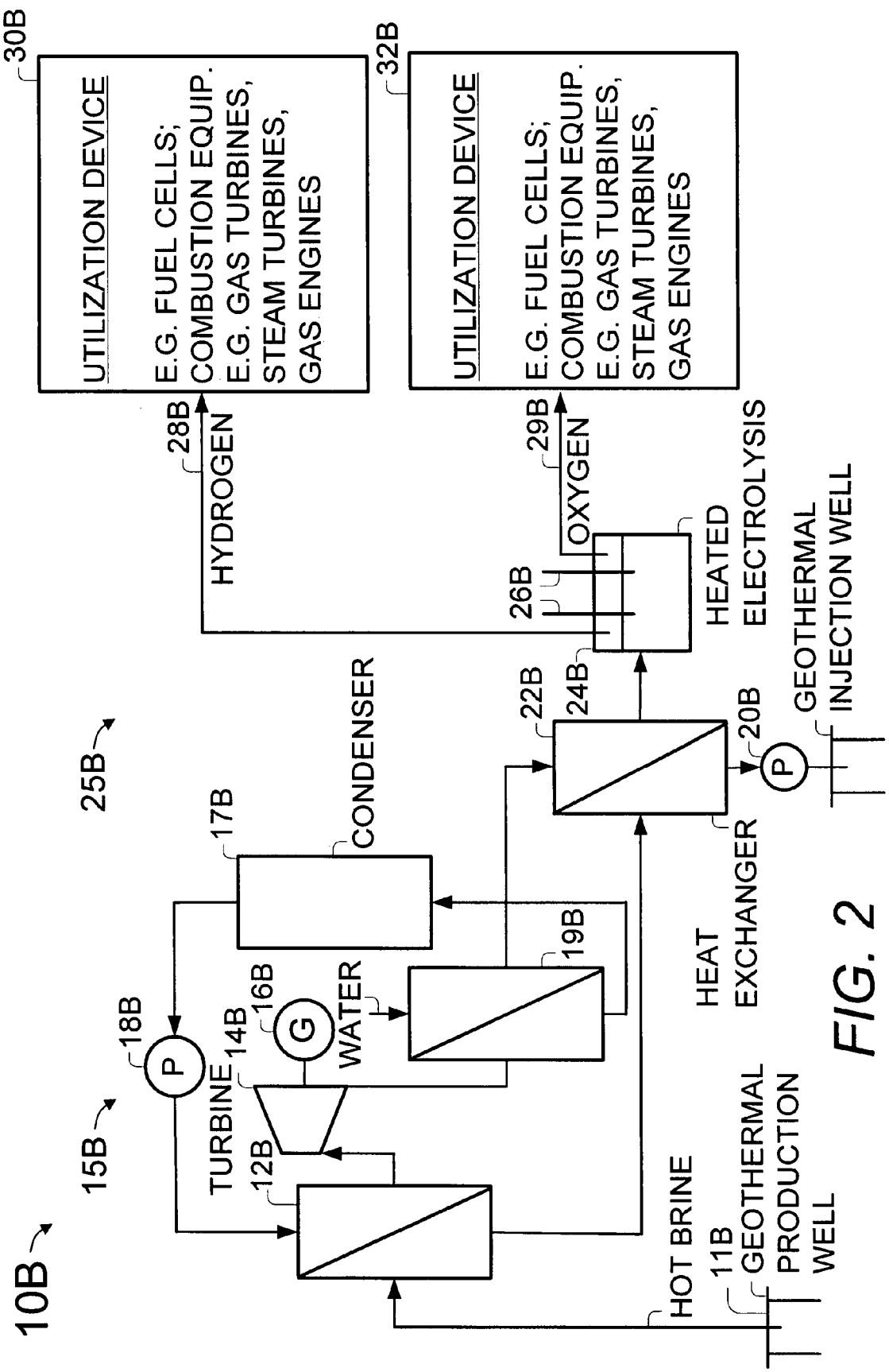
FIG. 2 is a graphical representation of a further embodiment of a combined power plant.

In an additional embodiment, see FIG. 2, part of the heat of condensation of the organic Rankine cycle turbine can be used for pre-heating the water to be used in electrolysis. Thus, this embodiment is very similar to the embodiment of the present invention described with reference to FIG. 1 except that heater 19B can be used for pre-heating water with heat present in expanded vapors exiting turbine 14B prior to supplying the water to heat exchanger 22B for further heating the water with geothermal fluid. In this embodiment combined power plant 10B includes vaporizer 12B of geothermal power plant 15B for vaporizing working fluid present in the vaporizer using heat present in geothermal liquid or brine supplied thereto, the geothermal liquid or brine being produced by a separator (not shown) that separates the geothermal liquid or brine as well as geothermal steam from geothermal fluid extracted from production well 11B. Working fluid vapor exiting vaporizer 12B is supplied to vapor turbine 14B where it is expanded and power is produced as well as expanded working fluid. Preferably, vapor turbine 14B drives electric generator 16B for producing electric power. Expanded working fluid vapor exiting vapor turbine 14B is first of all supplied to pre-heater 19B where it heats water supplied to pre-heater 19B and heat depleted working fluid vapor exiting pre-heater 19B is supplied to condenser 17B, which is an air-cooled condenser or a water-cooled condenser. The working fluid condensate produced in condenser 17B is then supplied to vaporizer 12B using cycle pump 18B. Preferably, an organic working fluid is used for working fluid of geothermal power plant 15B. Examples of such organic working fluids are butane, i.e. n-butane, or iso-butane, pentane, i.e. n-pentane, or iso-pentane, hexane, i.e. n-hexane, or iso-hexane, etc., and mixtures of the above-mentioned fluids, preferably, pentane, i.e. n-pentane, or iso-pentane.

In accordance with this embodiment of the present invention, heat depleted geothermal liquid or brine exiting vaporizer 12B is supplied to heat exchanger 22B of electrolysis system 25B for further heating water or solution supplied thereto from pre-heater 19B. Thereafter, the further heat-depleted geothermal liquid or brine is supplied to injection well 21B using pump 20B. The further heated water exiting heat exchanger 22B is supplied from heat exchanger 22B to electrolysis unit 24B wherein electrolysis of the heated water or heated solution is carried out. During electrolysis of the further heated water or further heated solution using electrodes 26B, hydrogen and oxygen are produced in hydrogen supply means 28B and oxygen supply means 29B. Hydrogen may be used in utilization device 30B to produce e.g. in electricity using e.g. fuel cells, combustion processes such as in gas turbines, steam turbines, internal combustion engines, etc. Alternatively, the hydrogen produced can be used to produce methanol or ammonia. Oxygen produced can be used in utilization device 32B e.g. in combustion processes such as in gas turbines or steam turbines, or used together with hydrogen in a fuel cell to produce electricity. In accordance with the present invention, the embodiment of the present invention can be used in any of the other embodiments of the present invention.

Figure 3:
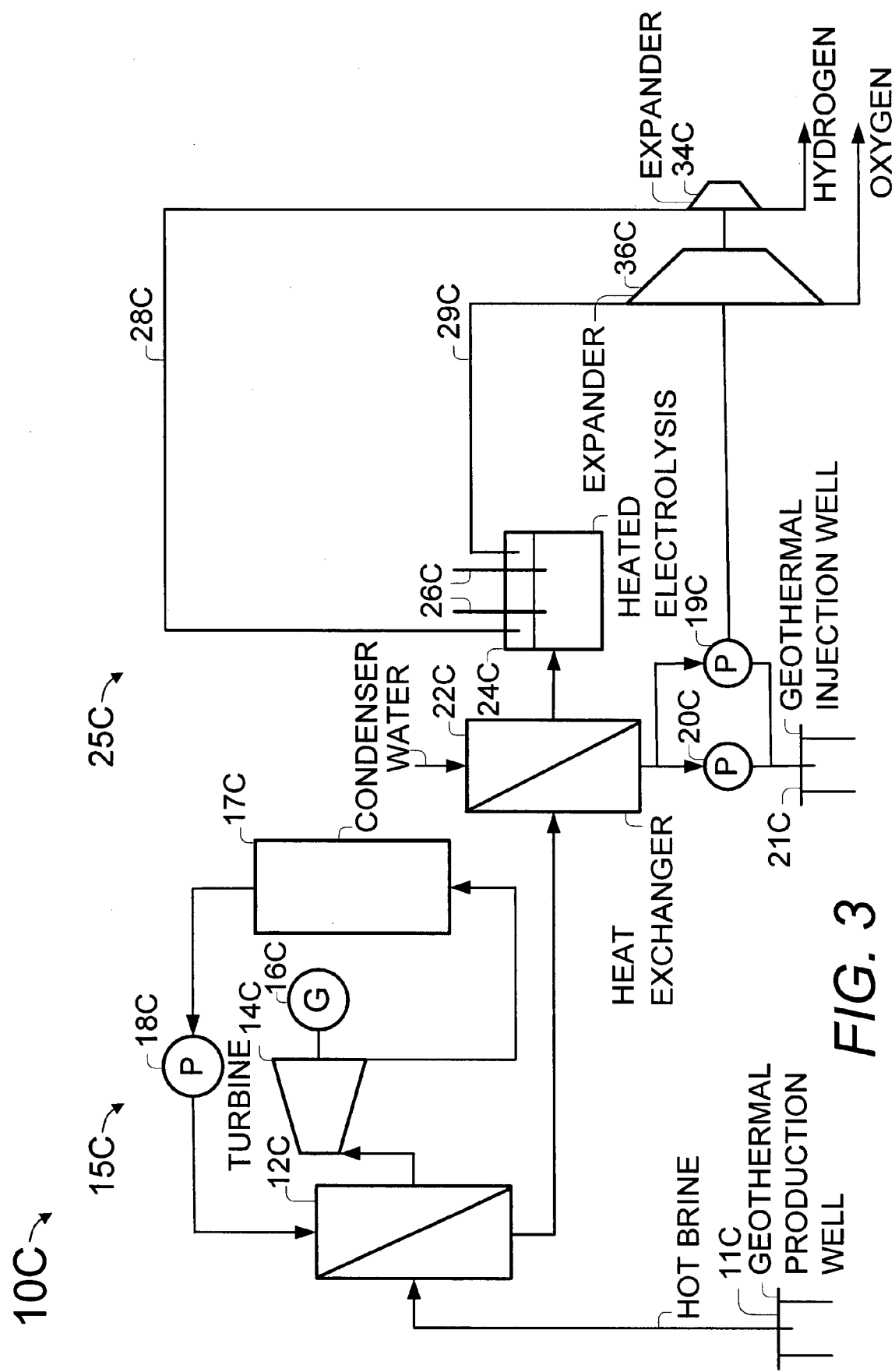
FIG. 3 is a graphical representation of an additional embodiment of a combined power plant.

FIG. 3 represents a further embodiment of a combined power plant that operates in accordance with the present invention. As can be seen from the figure, numeral 10C designates a combined power plant for the production of hydrogen using geothermal energy. Combined power plant 10C includes vaporizer 12C of geothermal power plant 15C for vaporizing working fluid present in the vaporizer using heat present in geothermal liquid or brine supplied thereto, the geothermal liquid or brine being produced by a separator (not shown) that separates the geothermal liquid or brine as well as geothermal steam from geothermal fluid extracted from production well 11C. Working fluid vapor exiting vaporizer 12C is supplied to vapor turbine 15C where it is expanded and power is produced as well as expanded working fluid. Preferably, vapor turbine 14C drives electric generator 16C for producing electric power. Expanded working fluid vapor exiting vapor turbine 14C is supplied to condenser 17C, which is an air-cooled condenser or a water-cooled condenser, and working fluid condensate is produced which is supplied to vaporizer 12C using cycle pump 18C. Preferably, an organic working fluid is used for working fluid of geothermal power plant 15C. Examples of such organic working fluids are butane, i.e. n-butane, or iso-butane, pentane, i.e. n-pentane, or iso-pentane, hexane, i.e. n-hexane, or iso-hexane, etc., and mixtures of the above mentioned fluids, preferably, pentane, i.e. n-pentane, or iso-pentane.

Also in accordance with this embodiment of the present invention, heat present in heat depleted geothermal liquid or brine exiting the vaporizer of the geothermal power plant is used in the electrolysis system. Thus, heat depleted geothermal liquid or brine exiting vaporizer 12C is supplied to heat exchanger 22C of electrolysis system 25C for heating water or solution supplied thereto. Thereafter, the further heat-depleted geothermal liquid or brine is supplied to injection well 21C using pump 20C. The heated water or heated solution exiting heat exchanger 22C is supplied to electrolysis unit 24C wherein electrolysis of the heated water or heated solution is carried out. During electrolysis of the heated water or heated solution using electrodes 26C hydrogen and oxygen are produced in hydrogen supply means 28C and oxygen supply means 29C. The hydrogen or portion thereof may be used also here to produce e.g. electricity using e.g. fuel cells, combustion processes such as in gas turbines, steam turbines, internal combustion engines, etc. Alternatively, also here, the hydrogen produced or portion thereof can be used to produce methanol or ammonia. Oxygen produced or portion thereof can be used also here e.g. in combustion processes such as in gas turbines or steam turbines, or used together with hydrogen in a fuel cell to produce electricity. However, in accordance with this embodiment of the present invention, hydrogen produced or portion thereof is used to operate expander 34C for expanding the hydrogen from its present pressure to a lower pressure such that expander 34C runs pump 19C for supplying at least portion of further heat-depleted geothermal liquid exiting heat exchanger 22C to the injection well. Likewise, oxygen produced or portion thereof is used to operate expander 36C for expanding the oxygen from its present pressure to a lower pressure such that expander 36C runs pump 19C for supplying at least portion of further heat-depleted geothermal liquid exiting heat exchanger 22C to the injection well.

Figure 4:
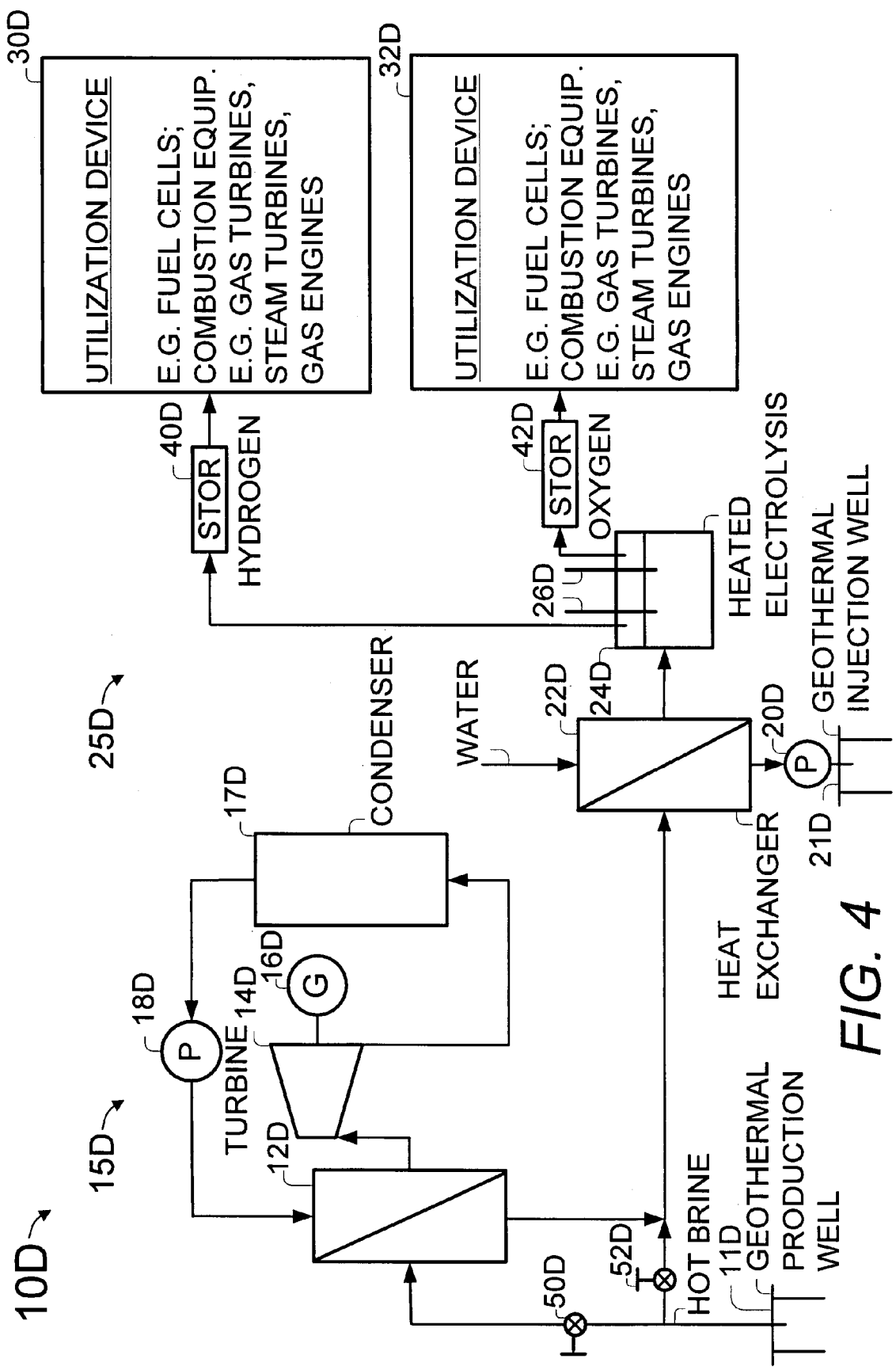
FIG. 4 is a graphical representation of a still further embodiment of a combined power plant.

In a further embodiment, see e.g. FIG. 4, the hydrogen and/or oxygen produced by the electrolysis system can be stored for use at a different time e.g. during peak hours of electricity demand rather than using the hydrogen online as produced. Basically, the operation of this embodiment is similar to that of the embodiment described with reference to FIG. 1 utilizing geothermal power plant 15D and electrolysis system 25D except that the hydrogen and/or oxygen produced by electrolysis system 25D is stored in hydrogen storage apparatus 40D and in oxygen storage apparatus 42D respectively for later use. Such later use can be e.g. during peak hours of electricity demand and the hydrogen and/or oxygen produced can be used in utilization devices 30D and 32D for producing electricity using e.g. fuel cells or combustion apparatus such as gas turbines or steam turbines, internal combustion engines, etc. Oxygen produced can be used in utilization device 32D e.g. in combustion processes such as in gas turbines or steam turbines, or used together with hydrogen in a fuel cell to produce electricity. In such a case, the hydrogen and/or oxygen can be stored for local used to that low-pressure (e.g. approximately between 3-10 atmospheres) storage can be used. Combined power plant 10D includes vaporizer 12D of geothermal power plant 15D for vaporizing working fluid present in the vaporizer using heat present in geothermal liquid or brine supplied thereto, the geothermal liquid or brine being produced by a separator (not shown) that separates the geothermal liquid or brine as well as geothermal steam from geothermal fluid extracted from production well 11D. Working fluid vapor exiting vaporizer 12D is supplied to vapor turbine 14D where it is expanded and power is produced as well as expanded working fluid. Preferably, vapor turbine 14D drives electric generator 16D for producing electric power. Expanded working fluid vapor exiting vapor turbine 14D is supplied to condenser 17D, which is an air-cooled condenser or a water-cooled condenser, and working fluid condensate is produced which is supplied to vaporizer 12D using cycle pump 18D. Preferably, an organic working fluid is used for working fluid of geothermal power plant 15D. Examples of such organic working fluids are butane, i.e. n-butane, or iso-butane, pentane, i.e. n-pentane, or iso-pentane, hexane, i.e. n-hexane, or iso-hexane, etc., and mixtures of the above-mentioned fluids, preferably, pentane, i.e. n-pentane, or iso-pentane.

In accordance with this embodiment of the present invention, heat depleted geothermal liquid or brine exiting vaporizer 12D is supplied to heat exchanger 22D of electrolysis system 25D for heating water or solution supplied thereto. Thereafter, the further heat-depleted geothermal liquid or brine is supplied to injection well 21D using pump 20D. The heated water or heated solution exiting heat exchanger 22D is supplied to electrolysis unit 24D wherein electrolysis of the heated water or heated solution is carried out. During electrolysis of the heated water or heated solution using electrodes 26D hydrogen and oxygen are produced in hydrogen supply means 28D and oxygen supply means 29D.

Also, the embodiments of the present invention described with reference to FIG. 1, FIG. 2 and FIG. 3 can also be used in the present embodiment. Thus, e.g. the hydrogen and/or oxygen produced can be first expanded in expanders like 34C and 36C (see FIG. 3) for driving pump 19C for supplying further heat-depleted geothermal liquid or brine to the injection well prior to storing the hydrogen and/or oxygen. However, in a further option, the stored hydrogen and oxygen can be used and often transported, if preferred, in e.g. certain industries, e.g. the manufacture of methanol or ammonia.

In addition, in this embodiment, if preferred, the ratio of geothermal liquid supplied to geothermal power plant 15D and to electrolysis system 25D can be changed and controlled using valve 50D (and valve 52D) so that more geothermal liquid can be supplied to electrolysis system 25D during e.g. off-peak electricity demand so that more hydrogen can be stored and subsequently used e.g. during peak hours of electricity demand to produce electricity.

By use of the present invention to heat the solution to be used in electrolysis with heat from geothermal fluid, the efficiency of the electrolysis process is increased. In addition, by using the pressure of the hydrogen and/or oxygen produced in accordance with the present invention, less electric power has to be used for such a purpose.

Furthermore, the present invention, particularly as described in the embodiment of the present invention with reference to FIG. 4, permits increased production of electricity during e.g. periods of peak demand for electricity. Moreover, the hydrogen and/or oxygen can be used locally, without having to substantially transport the gases, hydrogen and oxygen can be used at relatively low pressures and their use does not suffer from various market barriers which are often associated with hydrogen transport and prolonged storage.

In addition, while the embodiment of the present invention described with reference to FIG. 4 describes the use of a binary cycle organic Rankline cycle turbine for producing electricity from the geothermal fluid in e.g. a peaking power configuration, other power systems can be used instead, e.g. geothermal Flash Steam Power Plants, geothermal Steam Power plants, Enhanced Geothermal Systems (EGS) Power Plants, Hot Fractured Roc (HFR) and Hot Dry Rock (HDR)

Power Plants. In such geothermal Flash Steam Power Plants, geothermal Steam Power plants, geothermal steam produced from the geothermal fluid can be used.

It should be pointed out that the present invention is particularly advantageous for use with low to medium temperature geothermal resources and geothermal fluids and does not need to rely on supercritical geothermal steam or vapor. Furthermore, the present invention can be used preferably for low temperature and intermediate temperature electrolysis for solution temperatures up to 350° C.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. Apparatus for producing power using geothermal liquid produced from geothermal fluid extracted from a geothermal well comprising:
   a) a geothermal power plant for producing power indirectly using heat contained in geothermal liquid supplied thereto and produced from geothermal fluid extracted from a geothermal well; and
   b) indirect heat exchanger means for indirectly heating a solution using heat contained in heat depleted geothermal liquid exiting said geothermal power plant and indirectly transferring heat to said solution producing a heated solution for use in an electrolysis unit, wherein said electrolysis unit produces hydrogen for use in producing power.

2. Apparatus according to claim 1 wherein said geothermal power plant includes said vaporizer for vaporizing working fluid present in said vaporizer and producing working fluid vapor indirectly using heat present in said geothermal liquid produced from geothermal fluid extracted from a geothermal well, a vapor turbine for expanding said working fluid vapor and producing power, and a condenser for condensing the expanded working fluid exiting said vapor turbine and producing working fluid condensate and a cycle pump for supplying said working fluid condensate to said vaporizer.

3. Apparatus according to claim 2 wherein said working fluid is an organic working fluid.

4. Apparatus according to claim 2 further including supply means for supplying said heat depleted geothermal liquid exiting said vaporizer to said indirect heat exchanger for transferring heat contained in said heat depleted geothermal liquid to said solution and producing said heated solution for use in said electrolysis unit.

5. Apparatus according to claim 4 further including a pre-heater for indirectly pre-heating said solution prior to supplying it to said indirect heat exchanger with heat present in said expanded working fluid exiting said vapor turbine prior to supplying said expanded working fluid to said condenser.

6. Apparatus according to claim 4 including a pump that pumps further heat depleted geothermal liquid exiting said indirect heat exchanger to an injection well.

7. Apparatus according to claim 1 including further means for producing oxygen by electrolysis of said heated solution produced by heat contained in said heat depleted geothermal liquid for producing power.

8. Apparatus according to claim 7 wherein said oxygen produced by electrolysis of said heated solution with heat contained in said heat depleted geothermal liquid for generating power is produced while maintaining the flow rate of the said geothermal fluid extracted from a geothermal well.

9. Apparatus according to claim 1 wherein said hydrogen produced by said heated solution in said electrolysis unit with heat contained in said heat depleted geothermal liquid generating power is produced while maintaining the flow rate of the said geothermal fluid extracted from a geothermal well.

10. Apparatus according to claim 1 further including a fuel cell for producing power using said hydrogen produced by said electrolysis unit using said heated solution in said electrolysis unit with heat contained in said heat depleted geothermal liquid.

11. Apparatus according to claim 1 further including apparatus utilizing combustion processes for producing power using said hydrogen produced by electrolysis of said heated solution in said electrolysis unit with heat contained in said heat depleted geothermal liquid.

12. Apparatus according to claim 11 wherein said apparatus utilizing combustion processes comprises apparatus selected from the group consisting of gas turbines, steam turbines, and internal combustion engines.

* * * * *